United States Patent
Becker et al.

(10) Patent No.: US 10,713,198 B2
(45) Date of Patent: Jul. 14, 2020

(54) DIRECT MEMORY ACCESS CONTROL UNIT FOR A PROCESSING UNIT THAT INCLUDES A WORKING MEMORY

(71) Applicant: Robert Bosch GmbH, Stuttgart (DE)

(72) Inventors: Eugen Becker, Ludwigsburg (DE); Axel Aue, Korntal-Muenchingen (DE); Eckart Schlottmann, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 16/077,240

(22) PCT Filed: Feb. 21, 2017

(86) PCT No.: PCT/EP2017/053901
§ 371 (c)(1),
(2) Date: Aug. 10, 2018

(87) PCT Pub. No.: WO2017/148743
PCT Pub. Date: Sep. 8, 2017

(65) Prior Publication Data
US 2019/0050355 A1  Feb. 14, 2019

(30) Foreign Application Priority Data
Mar. 1, 2016  (DE) .................. 10 2016 203 307

(51) Int. Cl.
*G06F 13/30* (2006.01)
*G06F 9/54* (2006.01)
*G06F 13/18* (2006.01)

(52) U.S. Cl.
CPC .............. *G06F 13/30* (2013.01); *G06F 9/542* (2013.01); *G06F 9/546* (2013.01); *G06F 13/18* (2013.01)

(58) Field of Classification Search
CPC ...... G06F 13/28; G06F 13/1673; G06F 13/30; G06F 13/362; H04L 49/90; H04L 47/10
(Continued)

(56) References Cited

U.S. PATENT DOCUMENTS 5,870,622 A * 2/1999 Gulick ................ G06F 15/7864
345/502
6,061,748 A * 5/2000 Taglione .................. G06F 13/28
370/276

(Continued)

OTHER PUBLICATIONS

International Search Report dated May 15, 2017 of the corresponding International Application PCT/EP2017/053901 filed Feb. 21, 2017.
(Continued)

*Primary Examiner* — Faisal M Zaman
(74) *Attorney, Agent, or Firm* — Norton Rose Fullbright US LLP; Gerard Messina

(57) ABSTRACT

A processing unit has a working memory. A direct memory access control unit includes a terminal connecting the direct memory access control unit to a bus system that connects the processing unit to the working memory and is configured to: read in, from at least two information blocks stored in the working memory and provided by the processing unit for transmission to a communication module connected to the bus system, pieces of control information characterizing respective priorities of the respective information blocks for the transmission to the communication module; ascertain a sequence for the transmission based on the respective priorities; and transmit the information blocks from the working memory to the communication module according to the ascertained sequence using a direct memory access from the working memory to the communication module.

15 Claims, 3 Drawing Sheets

(58) Field of Classification Search
USPC .......... 710/22, 308, 28, 40, 25, 23, 113, 52
See application file for complete search history.

(56) References Cited

U.S. PATENT DOCUMENTS

| | | |
|---|---|---|
| 2004/0136397 A1* | 7/2004 | Vinnakota ............... H04L 12/66 370/462 |
| 2006/0174169 A1 | 8/2006 | Inoue et al. |
| 2006/0259656 A1 | 11/2006 | Sullivan |
| 2008/0183913 A1* | 7/2008 | Ryu ....................... G06F 13/28 710/25 |
| 2011/0119672 A1* | 5/2011 | Ramaraju ............. G06F 9/5044 718/102 |
| 2015/0019923 A1* | 1/2015 | Michels ............ G06F 15/17331 714/718 |
| 2015/0207956 A1* | 7/2015 | Fukushima .............. H04N 1/21 358/1.16 |
| 2015/0220460 A1 | 8/2015 | Litch et al. |
| 2016/0085279 A1* | 3/2016 | Culshaw .................. G06F 1/24 327/142 |
| 2016/0103769 A1* | 4/2016 | Glickman ........... G06F 12/1081 711/6 |
| 2016/0239443 A1* | 8/2016 | Miura .................... G06F 13/30 |

OTHER PUBLICATIONS

Schiffmann, W.; Schmitz, R.: Technische Informatik 2, Grundlagen der Computertechnik. 4. Auflage. Berlin: Springer, 2002. Seiten 89 bis 91.

* cited by examiner

DIRECT MEMORY ACCESS CONTROL UNIT FOR A PROCESSING UNIT THAT INCLUDES A WORKING MEMORY

CROSS-REFERENCE TO RELATED APPLICATIONS

The present application is the national stage of International Pat. App. No. PCT/EP2017/053901 filed Feb. 21, 2017, and claims priority under 35 U.S.C. § 119 to DE 10 2016 203 307.7, filed in the Federal Republic of Germany on Mar. 1, 2016, the content of each of which are incorporated herein by reference in their entireties.

FIELD OF THE INVENTION

The present invention relates to a direct memory access control unit and a method for operation thereof.

BACKGROUND

Processing units, for example, processors that include one or multiple processor cores and that are able to access a working memory are known on the market. Processing systems that include one or multiple processing units generally also include a plurality of additional units that cooperate with the processing unit, for example, input components and output components ("IO") and the like. At least some of the aforementioned elements of the processing system are able to exchange data with one another via a shared, preferably parallel bus. In addition, methods for a so-called direct memory access, DMA, are known, through which the exchange of data can be improved via the shared bus. One example of such a processing unit is the MPC5777M of NXP.

SUMMARY

Features important for the present invention are found in the following description and in the drawings, whereby the features both by themselves as well as in different combinations can be important for the present invention, without explicit reference being made again thereto.

The present invention relates to a direct memory access control unit for a processing unit that includes a working memory, the direct memory access control unit including a terminal for connecting the direct memory access control unit to a bus system that connects the processing unit to the working memory. The direct memory access control unit is designed to carry out the following steps:

reading in pieces of control information from at least two information blocks stored in the working memory, which are provided by the processing unit for transmission to a communication module, which is connected to the bus system, the pieces of control information characterizing a priority of the respective information block for the transmission to the communication module, ascertaining a sequence for the transmission of the information blocks to the communication module as a function of the respective priority, transmitting the information blocks from the working memory to the communication module according to the ascertained sequence using a direct memory access from the working memory to the communication module.

The transmission of the information blocks described in such a way characterizes in the present case a so-called "Tx-operation," i.e., from the working memory to the communication module.

The aforementioned information blocks can include "payload data" and/or pieces of control information and, for example, can also form complete data packets, as they can be exchanged with other units by the communication module via a bus system and/or a data network. The processing unit can include one or multiple processor cores, the processor cores also being referred to below as processing units. The processor cores or processing units can be situated in a shared component (integrated circuitry) or in separate components, respectively.

The working memory can be designed as a central working memory, which is usable jointly by the processor cores and/or a respectively associated working memory unit can also be provided for each of the processor cores. This working memory unit, together with the respective processor core, can be situated in a shared component ("internal") or can be separated physically therefrom ("external").

The direct memory access control unit is preferably designed with the aid of hardware, i.e., with the aid of one or multiple discrete and/or integrated electronic components.

In one embodiment, the direct memory access control unit is a separate unit, which is used in addition to a direct memory access control unit already known from the related art.

In one embodiment, the communication module is designed to couple a CAN bus system functionally with the processing unit or with the processing units, as well as with the working memory or with the working memory units. In one embodiment, the communication module includes a so-called "MCAN module," which is able to communicate with a CAN bus, to which a plurality of CAN bus users referred to here as "logical units" are connected. The abbreviation "CAN" means "controller area network." The letter "M" characterizes a manufacturer-specific name affix.

In one preferred embodiment, the working memory is designed in each case as a memory with random access, RAM, as in "random access memory." Other types of memory are also possible, however.

In one embodiment, the direct memory access control unit is designed to ascertain which information block in each case has the highest priority. Accordingly, a transmission of the information block having the highest priority takes place using a direct memory access from the working memory to the communication module.

Simply put, the direct memory access control unit carries out the transmission of the information blocks as a function of information contents or data contents, in particular, of the information blocks and automatically decides in each case which transmission is carried out next. The present invention has the advantage that in a processing system, which includes at least one processing unit or at least one processor core, as well as one working memory or multiple working memories and at least one communication module, a transmission of information blocks carried out with the aid of a direct memory access can be further improved.

A further advantage is that the direct memory access control unit increases the performance of communication modules that have not been expressly designed for operating with a so-called "multicore system" (i.e., a processing unit that includes multiple processor cores), but were only developed with the design goal of communicating with one processor core. Compare, for example, the "MCAN module" described above. In this way, the principle according to the present invention enables a simple connection of a MCAN module based on direct memory accesses also to processing units that include multiple processor cores. Thus, the potential applications are expanded accordingly.

Even if the aforementioned communication modules are not present as a physical component, but are merely emulated with the aid of hardware and/or of software, an operation also with multicore systems is advantageously possible thanks to the direct memory access control unit.

In one embodiment, the direct memory access control unit is designed to carry out at least one of the following additional steps:
- receiving a signal, in particular, a trigger signal, from the processing unit,
- reading in the pieces of control information as a function of the received signal. The information blocks or the pieces of control information each include, for example, a bit position for the trigger signal, the direct memory access control unit being designed to regularly query corresponding bit positions in the working memory, whether or not the respective trigger signal is set by the processing unit. Once the trigger signal is ascertained as set, the direct access memory control unit recognizes from this that the relevant information block is to be transmitted to the communication module.
- evaluating first pieces of configuration information that control a priority evaluation,
- ascertaining a first priority and/or a second priority from the pieces of control information,
- ascertaining the sequence for the transmission of the information blocks to the communication module as a function of the first pieces of configuration information and of the respective first and/or respective second priorities, the sequence being optionally ascertained as a function of the respective first priorities or of the respective second priorities or of the respective first and respective second priorities, in particular, ascertaining the sequence for the transmission of the information blocks to the communication module as a function of the respective first priority if the respective first priorities are different, or as a function of the respective second priority if the respective first priorities are the same.
- conveying a transmission request from the direct memory access control unit to the communication module,
- sending an acknowledgement signal to the processing unit and/or setting or resetting a flag in an information block for a successful transmission of the information block from the working memory to the communication module.

In one embodiment, the acknowledgement signal is the ACK-bit described above, which can be set by the processing unit, as a result of which the direct memory access control unit can be prompted to subsequently carry out the reading-in of the control information. The sending of the acknowledgement signal then corresponds to a resetting of the ACK-bit by the direct memory access control unit. In another embodiment, the ACK-bit or a bit position of the ACK-bit is different from the flag or from a bit position of the flag.

In one advantageous example embodiment, the acknowledgement signal can be provided to indicate that data have been successfully delivered to the communication module, for example, a MCAN module, for sending (including Tx request). For this purpose, the direct memory access control unit can set a bit in the message for the CPU (for example, intern_TransSuccess).

In another advantageous example embodiment, the direct memory access control unit transmits the message to the communication module, for example, a MCAN module, and sets in addition, for example, a Tx request. After a successful sending by the MCAN module, the MCAN module sets the corresponding unique bit in the MCAN module, and only then does the direct access memory control unit transmit an acknowledgement signal to the CPU, according to which the transmission is successfully completed. This can take place via the ACK-bit previously described above.

The aforementioned additional steps can advantageously improve the communication between the processing unit or processing units, the working memory or working memory units, the direct access memory control unit and/or the communication module.

The aforementioned first pieces of configuration information can advantageously control the optional use of the first priorities and/or of the second priorities. The second priority can be defined, for example, with the aid of one or of multiple bit positions ("bit field") in a respective information block, for example in a header of the information block. However, these bits are particularly preferably provided as additional pieces of information to a CAN message, and are not included in the CAN message itself—i.e., pure control information.

The first priority and/or the second priority is/are preferably transmitted in the pieces of control information of the respective information block. In one embodiment, the sequence is ascertained as a function of the first pieces of configuration information solely with the aid of the first priority. In another embodiment, the sequence is ascertained as a function of the first pieces of configuration information solely with the aid of the second priority.

In another embodiment, the direct memory access control unit is designed to carry out the following steps:
- reading in pieces of control information from at least two of the information blocks supplied by the communication module, which are provided by the communication module for transmission to the working memory, which is connected to the bus system, these pieces of control information characterizing a priority of the respective information block for the transmission to the working memory,
- ascertaining a sequence for the transmission of the information blocks to the working memory as a function of the respective priority,
- transmitting the information blocks from the communication module to the working memory according to the ascertained sequence using a direct memory access from the communication module to the working memory.

In another use, in which, for example, only one Rx buffer (receive buffer) is configured in a MCAN module, one trigger is sufficient for transmitting from the MCAN module to the RAM. This can be, for example, a NEWDATA flag in the MCAN module. In these cases, a priority control can also be dispensed with.

The transmission of the information blocks described in this way characterizes in the present case a so-called "Rx-operation," i.e., from the communication module to the working memory. Comparable advantages result, as was described further above for the "Tx-operation."

In another embodiment, the direct memory access control unit is designed to carry out at least one of the following additional steps:

receiving a signal, in particular, a trigger signal, from the communication module, as a result of which the direct memory access control unit can be prompted to subsequently carry out the reading-in of the pieces of control information, reading in the pieces of control information, in particular, from the at least two information blocks supplied by the communication module, as a function of the received signal.

evaluating first pieces of configuration information that control a priority evaluation, ascertaining a first priority and/or a second priority from the pieces of control information.

ascertaining the sequence for the transmission of the information blocks to the working memory as a function of the first pieces of configuration information and of the respective first priorities and/or respective second priorities, the sequence being optionally ascertained as a function of the respective first priorities or of the respective second priorities or of the respective first priorities and respective second priorities, in particular, ascertaining the sequence for the transmission of the information blocks to the working memory as a function of the respective first priority if the respective first priorities are different, or as a function of the respective second priority if the respective first priorities are the same, setting a flag, in particular, a new flag, in an information block to be transmitted, and/or sending an interrupt to the processing unit, the new flag or the interrupt being provided to communicate that a transmission of the information block to the working memory has taken place, ascertaining a target address range in the working memory and/or ascertaining a local working memory unit of the working memory, and sending an acknowledgement signal to, and/or setting a flag in, the communication module for a successful transmission of an information block from the communication module to the working memory.

The local interrupt to the processing unit enables the processing unit to be able to respond immediately if a respective information block to be sent by the communication module is to be transmitted preferably rapidly into the working memory. As a result of the interrupt, the processing unit is able to advantageously process preferably rapidly the previously copied data and, in the process, no longer requires any accesses to a remote memory.

The aforementioned steps can advantageously improve the communication between the processing unit or processing units, the working memory or the working memory units, the direct memory access control unit and/or the communication module. The use of the (optional) second priority likewise allows for an additional improvement when ascertaining the sequence.

In one embodiment, the aforementioned "first" pieces of configuration information for the Rx operation can include a different content than the "first" pieces of configuration information for the Tx operation described above. In another embodiment, the sequence is ascertained as a function of the first pieces of configuration information solely with the aid of the first priority. In another embodiment, the sequence is ascertained as a function of the first pieces of configuration information solely with the aid of the second priority.

In another embodiment, the direct access memory control unit is designed to carry out the following steps:

reading in pieces of control information from at least one first information block stored in the working memory, which is provided by the processing unit for transmission to the communication module, which is connected to the bus system, the pieces of control information characterizing a priority of the at least one first information block for the transmission to the communication module, reading in pieces of control information from at least one second information block supplied by the communication module, which is provided by the communication module for transmission to the working memory, which is connected to the bus system, these pieces of control information characterizing a priority of the at least one second information block for the transmission to the working memory, ascertaining a sequence for the transmission of the at least one first information block and of the at least one second information block as a function of the respective priority of the at least one first information block and of the at least one second information block, and transmitting the at least one first information block from the working memory to the communication module and/or transmitting the at least one second information block from the communication module to the working memory according to the ascertained sequence using a direct memory access.

The transmission of the information blocks described in this way characterizes in the present case a mixed "Tx-operation" and "Rx-operation," i.e., on the one hand, from the working memory to the communication module, and on the other hand, from the communication module to the working memory. Because invariably only one information block can be transmitted at a respective time on the bus system with the aid of the direct memory access, a prioritization for both transmission directions is advantageously carried out by the steps described. A prioritization also takes place within a respective transmission direction, as was described further above for the Tx-operation and the Rx-operation.

Thus, the direct memory access control unit is designed to ascertain the sequence for the Tx-operation on the one hand and the sequence for the Rx-operation on the other hand, and consequently also to carry out a prioritization between the Tx-operation and the Rx-operation. In other words: the direct access memory control unit gives priority to the information block that on the whole is most urgent.

Corresponding advantages result, as was described further above for the Tx-operation and for the Rx-operation. It is understood here that for the mixed Tx-operation and Rx-operation as well, the "additional" steps described separately above for the mixed Tx-operation and Rx-operation, respectively, may, to the extent applicable, be advantageously supplemented for the direct memory access control unit.

In another embodiment, the direct memory access control unit includes second pieces of configuration information, the second pieces of configuration information characterizing respective logical units communicating with the communication module and/or pieces of control information to be sent and/or to be received by the respective logical units. As a result, the ascertainment of the sequence can be advantageously improved. In one embodiment, the communication module is designed to be coupled with a CAN bus system, the aforementioned second pieces of configuration information each including respective CAN-IDs or CAN object identifiers. In another embodiment, the second pieces of configuration information include only the CAN-IDs required for the Rx-operation.

In another embodiment, the direct memory access control unit includes third pieces of configuration information, the third pieces of configuration information including variables which characterize the processing unit (or the processing units or processor cores) and/or the working memory (or the working memory units), for example, a so-called "CPU number." The ascertainment of the sequence can be advantageously improved in this way as well. In another embodiment, the third pieces of configuration information include only the CPU numbers required for the Rx-operation.

In another embodiment, the direct memory access control unit includes fourth pieces of configuration information, the fourth pieces of configuration information characterizing a respective source and/or a respective target for the transmission of the information blocks. As a result, the information blocks can be transmitted into an associated buffer memory ("dedicated buffer") or into a ring buffer memory ("ring buffer") in the working memory ("system RAM") or into a respective working memory unit ("local CPU RAM") assigned to the processing unit. With the aid of configuration it is possible in this case to advantageously predefine a respectively required transmission type or a respective transmission target. This can affect, in particular, the Rx-operation.

In one embodiment, the direct memory access control unit is designed, in particular only, to carry out the Tx-operation. In another embodiment, the direct memory access control unit is designed, in particularly only, to carry out the Rx-operation.

In another embodiment, a direct memory access control unit is provided for a processing unit that includes a working memory, the direct memory access control unit including a terminal for connecting the direct memory access control unit to a bus system that connects the processing unit to the working memory, wherein the direct memory access control unit is designed to carry out the following steps: —reading in pieces of control information from at least two information blocks supplied by the communication module, which are provided by the communication module for transmission to the working memory, which is connected to the bus system, these pieces of control information characterizing a priority of the respective information block for the transmission to the working memory, —ascertaining a sequence for the transmission of the information blocks to the working memory as a function of the respective priority, —transmitting the information blocks from the communication module to the working memory according to the ascertained sequence using a direct memory access from the communication module to the working memory. Thus, this embodiment defines a data transmission in the Rx direction (i.e., from the communication module to the working memory), in particular, independently of a data transmission in the Tx direction, which is optionally also conceivable in additional variants of this embodiment.

The present invention further relates to a method for operating a direct memory access control unit for a processing unit that includes a working memory, the direct memory access control unit including a terminal for connecting the direct memory access control unit to a bus system that connects the processing unit to the working memory. The method in this case includes the following steps:

reading in pieces of control information from at least two information blocks stored in the working memory, which are provided by the processing unit for transmission to a communication module, which is connected to the bus system, the pieces of control information characterizing a priority of the respective information block for the transmission to the communication module, ascertaining a sequence for the transmission of the information blocks to the communication module as a function of the respective priority, and transmitting the information blocks from the working memory to the communication module according to the ascertained sequence using a direct memory access from the working memory to the communication module.

Comparable advantages result, as was described further above for the direct memory access control unit for the Tx-operation.

In one embodiment, the method includes at least one of the following steps:

receiving a signal, in particular, a trigger signal, and/or an ACK-bit, as in "acknowledge," and or an interrupt, from the processing unit, reading in the pieces of control information as a function of the received signal, evaluating first pieces of configuration information that control a first priority evaluation, ascertaining a first priority and/or a second priority from the pieces of control information, ascertaining the sequence for the transmission of the information blocks to the communication module as a function of the first pieces of configuration information and as a function of the respective first priorities and/or respective second priorities, the sequence optionally being ascertained as a function of the respective first priorities or of the respective second priorities or of the respective first and respective second priorities, in particular, ascertaining the sequence for the transmission of the information blocks to the communication module as a function of the respective first priority if the respective first priorities are different, or as a function of the respective second priority if the respective first priorities are the same, conveying a transmission request from the direct access memory control unit to the communication module, and sending an acknowledgement signal to the processing unit and/or setting or resetting a flag in an information block for a successful transmission of the information block from the working memory to the communication module.

Comparable advantages result, as was described above for the additional steps of the direct memory access control unit for the Tx-operation.

In another embodiment, the method includes the following steps:

reading in pieces of control information from at least two information blocks supplied by the communication module, which are provided by the communication module for transmission to the working memory connected to the bus system, these pieces of control information characterizing a priority of the respective information block for the transmission to the working memory, ascertaining a sequence for the transmission of the information blocks to the working memory as a function of the respective priority, and transmitting the information blocks from the communication module to the working memory according to the ascertained sequence using a direct memory access from the communication module to the working memory.

Comparable advantages result, as was described above for the direct memory access control unit for the Rx-operation.

In another embodiment, the method includes at least one of the following steps:

receiving a signal, in particular, a trigger signal, from the communication module, as a result of which the direct memory access control unit can be prompted to subsequently carry out the reading-in of the pieces of control information, reading in the pieces of control information, in particular, of the at least two of the information blocks supplied by the communication module as a function of the received signal, evaluating first pieces of configuration information that control a priority evaluation, ascertaining a first priority and/or a second priority from the pieces of control information, ascertaining the sequence for the transmission of the information blocks to the working memory as a function of the first pieces of configuration information and of the respective first and/or respective second priorities, the sequence optionally being ascertained as a function of the respective first priorities or of the respective second priorities or from the respective first and respective second priorities, in particular, ascertaining the sequence for the transmission of the information blocks to the working memory as a function of the respective first priority, if the respective first priorities are different, or as a function of the respective second priority, if the respective first priorities are the same, setting a flag, in particular, a new flag, in an information block to be transmitted, and/or sending an interrupt to the processing unit, the new flag or the interrupt being provided to communicate to the processing unit that a transmission of the information block to the working memory has taken place, ascertaining a target address range in the working memory and/or ascertaining a local working memory unit of the working memory, and sending an acknowledgement signal to, and/or setting a flag in, the communication module for a successful transmission of an information block from the communication module to the working memory.

Comparable advantages result, as was described above for the additional steps of the direct memory access control unit for the Rx-operation.

In another embodiment, the method includes the following steps:

reading in pieces of control information from at least one first information block stored in the working memory, which is provided by the processing unit for transmitting to the communication module, which is connected to the bus system, the pieces of control information characterizing a priority of the at least one first information block for the transmission to the communication module, reading in pieces of control information from at least one second information block supplied by the communication module, which is provided by the communication module for transmitting to the working memory, which is connected to the bus system, these pieces of control information characterizing a priority of the at least one second information block for the transmission to the working memory, ascertaining a sequence for the transmission of the at least one first information block and of the at least one second information block as a function of the respective priority of the at least one first information block and of the at least one second information block, and transmitting the at least one first information block from the working memory to the communication module and/or transmitting the at least one second information block from the communication module to the working memory according to the ascertained sequence using a direct memory access.

Comparable advantages result, as was described further above for the direct memory access control unit for the mixed Tx-operation and Rx-operation. It is understood here that for the mixed Tx-operation and Rx-operation as well, the "additional" steps described separately above for the mixed Tx-operation and Rx-operation, respectively, may, to the extent applicable, be advantageously supplemented by the method.

In a particularly preferred example embodiment, it is possible to feature a gateway functionality with the aid of the direct memory access control unit. After a message is received in the communication module, the corresponding data are transmitted by the direct memory access control unit, for example, to the memory of the processing unit and are available there for the processing unit. The same data can also be advantageously further used for a transmission to other communication modules. This means, the data initially transmitted (Rx direction) in a first step by the direct memory access unit to the memory of the processing unit can be transmitted (Tx direction) in a second step by the direct memory access control unit to the same communication module and/or to other communication modules, in particular, MCAN modules, for dispatching to other users. In this case, it is conceivable to collect the Rx data from various CAN nodes and to mark only particular messages for further sending. According to one example embodiment, there is advantageously also the further possibility of sending out the messages at specific time intervals. A particular advantage of this example embodiment is that the gateway functionality operates without a controlling processing unit or CPU and as a result requires no additional performance.

Exemplary example embodiments of the present invention are explained below with reference to the drawings, in all of which the same reference numerals are used for functionally equivalent elements and variables, even in the case of different example embodiments.

DETAILED DESCRIPTION

Figure 1:
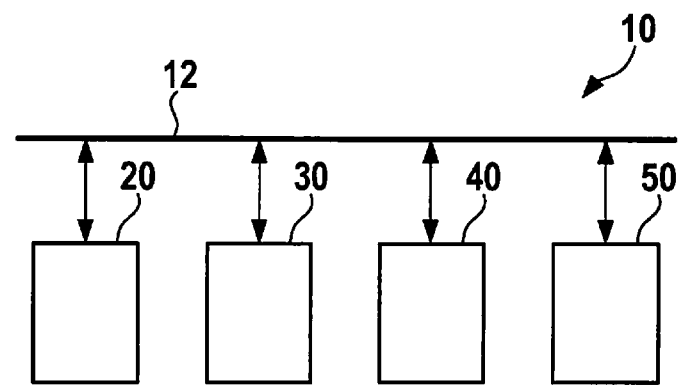
FIG. 1 is a highly simplified block diagram for a processing system that includes a bus, according to an example embodiment of the present invention.

FIG. 1 shows a highly simplified block diagram for a processing system 10 that includes a processing unit 20, a working memory 30 and a direct memory access control unit 40, each of which are connected to a bus system 12 that connects processing unit 20 to working memory 30. FIG. 1 also shows a communication module 50, which is connected to bus system 12.

Figure 2:
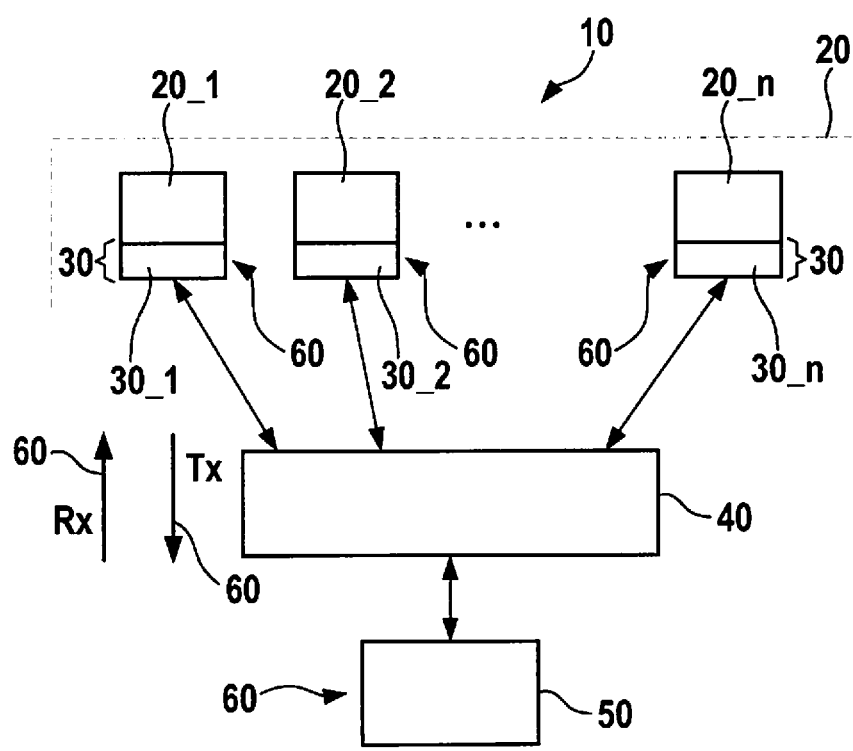
FIG. 2 shows a processing system that includes a plurality of processing units and working memory units respectively assigned to the processing units, according to an example embodiment of the present invention.

FIG. 2 shows a processing system 10, which in the present case includes a processing unit 20, including a plurality of processor cores and working memory units 30_1, 30_2 through 30_n assigned to the processor cores, respectively. Working memory units 30_1, 30_2 through 30_n together form a working memory 30 of processing system 10. The aforementioned processor cores are referred to in the present case as processing units 20_1, 20_2 through 20_n.

Processing system 10 further includes direct memory access control unit 40 and communication module 50.

In one example embodiment, communication module 50 is designed to be operated with a processing unit 20, which includes only one processor core. In another example embodiment, communication module 50 is designed to be operated with multiple processor cores. Both example embodiments of communication module 50 can be alternatively used in processing system 10 of FIG. 2 or 3.

Working memory 30 or working memory units 30_1, 30_2 through 30_n may, for example, be an "external" RAM, memory with random access, as in "random access memory," or an "internal" RAM associated with processing unit 20 or processing units 20_1, 20_2, 20_n.

Processing unit 20, working memory units 30_1 through 30_n, direct memory access control unit 40 and communication module 50 are connected to one another via shared bus system 12 (see FIG. 1), via which information blocks 60 can be exchanged. Information blocks 60 can include "payload data" and/or pieces of control information. In the present case, only information blocks 60 are considered, which are exchanged or are to be exchanged between working memory 30 and communication module 50.

The bus system can be designed, for example, as a parallel bus system having an address bus that includes a first number of address lines and a data bus that includes a second number of data lines.

The double arrows plotted in FIG. 2 between working memory units 30_1, 30_2 through 30_n and direct memory access control unit 40, as well as between direct memory access control unit 40 and communication module 50, characterize in the present case a respective functional assignment and only conditionally a respective physical connection.

Also plotted to the left in FIG. 2 are arrows, which characterize a transmission direction for information blocks 60 with respect to a "Tx-operation" or "Rx-operation," as will be explained in greater detail below.

Communication module 50 is designed to send and receive a potential plurality of information blocks 60, each of information blocks 60 being characterized by a specific priority, as will be explained in greater detail below. Communication module 50 is preferably connected to a plurality of data sources and/or data sinks (not depicted), which are able to communicate, for example, with communication module 50 via discrete lines or via one or multiple busses (not depicted).

Communication module 50 in the present case includes a so-called "MCAN module," which is able to communicate with a CAN bus not depicted, to which a plurality of CAN bus users, referred to here as "logical units" are connected. The abbreviation "CAN" means "Controller Area Network." The letter "M" characterizes a manufacturer-specific name affix.

The MCAN module or communication module 50 includes, for example, the following partial circuits, among other things:
  an interface management ("interface management logic") for bus system 12,
  a transmit buffer,
  one or multiple receive buffers,
  a data processor ("bit stream processor"),
  an error management unit ("error management logic"),
  a transmission logic ("transceiving logic"),
  a time control ("bit timing logic"), and/or
  an interface logic ("line interface logic") for a connected CAN bus system.

Thus, FIG. 2 shows, among other things, a direct access memory control unit 40 for a processing unit 20 that includes working memory 30, direct memory access control unit 40 including a terminal for connecting direct memory access control unit 40 to bus system 12, which connects processing unit 20 to working memory 30. Direct memory access control unit 40 is designed to carry out multiple method steps, which are explained in still greater detail below in conjunction with FIGS. 4 through 6.

In one example embodiment, processing unit 20 and/or working memory 30 and/or direct memory access control unit 40 and/or a respective information block 60 is/are characterized by, among other things, the following essentially self-explanatory variables, pieces of control information and/or pieces of configuration information:
  For a so-called "Tx-configuration": CAN_ID(1 . . . n) Data ACK.
  For a so-called "Rx-configuration": CAN_ID(1 . . . n) Data NEW.

In one example embodiment, processing unit 20 and/or working memory 30 and/or direct access memory control unit 40 and/or a respective information block 60 is/are characterized by, among other things, the following essentially self-explanatory variables, pieces of control information and/or pieces of configuration information:
  For the "Tx-configuration":
  SrcAddr Len TargetAddr Prio ID(1 . . . n) ACK Intern_TransSuccess
  For the "Rx-configuration":
  SrcAddr Len TargetAddr ID(1 . . . n) CPUx New Intr.
  with the following meanings:
  SrcAddr—source address as a configuration,
  Len—length as a configuration—how many bytes must be transmitted,
  TargetAddr—target address as a configuration,
  ID(1 . . . n)—ID of an Rx message as a configuration—necessary for deciding whether an interrupt is to be subsequently triggered to the CPU,
  CPUx—Once the message has been received, the interrupt is triggered to the CPUx—configuration bit, NEW—means the new data have been received—is set by the DMA and reset by the CPU, Intr—interrupt—configuration bit, means trigger interrupt once the message has been received.

In one example embodiment, a respective priority is ascertained with the aid of a comparison of bit values, the bit values being characterized by a segment of the respective pieces of control information. The three bit sequences depicted below show an example. In this case, the bit sequences are compared bit by bit from left to right, a respective "0" being dominant over a respective "1".

| | |
|---|---|
| 0/0/0/1/0/0/1/ . . . 0/0/1 | bit sequence 1 |
| 0/0/0/0/0/1/0/ . . . 0/0/0 | bit sequence 2 |
| 0/0/0/0/0/0/1/ . . . 0/0/0/ | bit sequence 3 |

According to this example, the information block associated with bit sequence 3 would be transmitted first, then the information block associated with bit sequence 2, and thereafter the information block associated with bit sequence 1.

Figure 3:
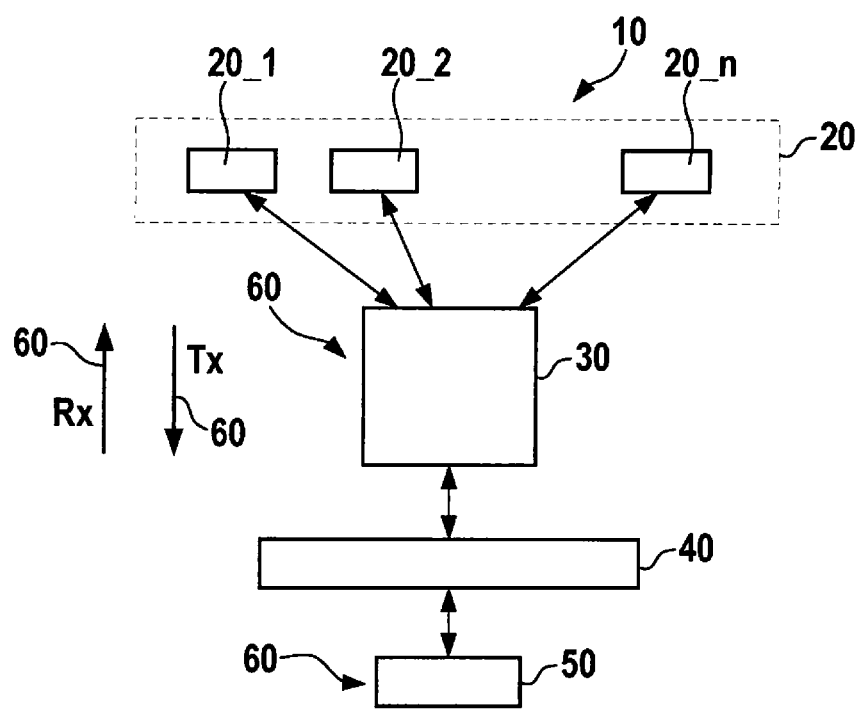
FIG. 3 shows a processing system that includes a plurality of processing units and a working memory shared by the processing units, according to an alternative example embodiment of the present invention.

FIG. 3 shows an additional example embodiment of processing system 10 similar to FIG. 2. Unlike FIG. 2, FIG. 3 shows a working memory 30 shared for all processing units 20_1, 20_2 through 20_n, which is executed, for example, with the aid of one or of multiple integrated circuits or with the aid of one or of multiple so-called "RAM memory modules."

Figure 4:
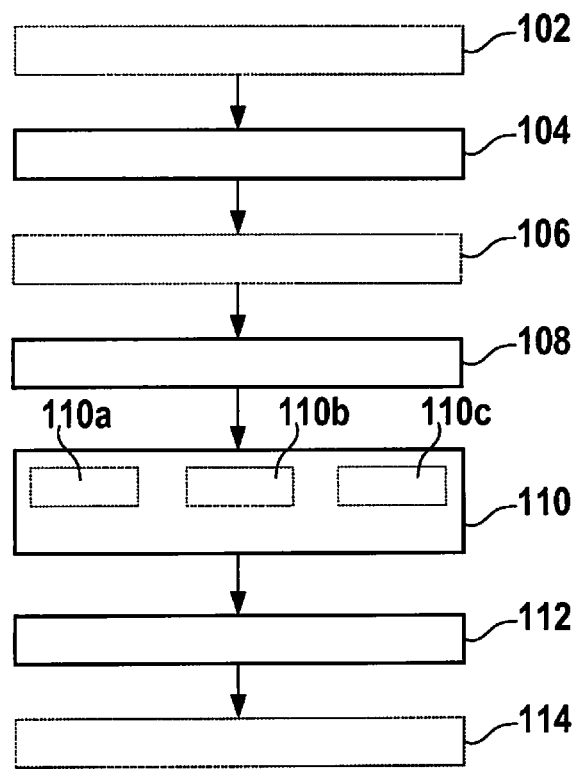
FIG. 4 is a flowchart of a method for operating the processing system according to FIG. 2 or 3 for carrying out a direct memory access, according to an example embodiment of the present invention.

FIG. 4 is a flowchart for a first example embodiment of a method for operating direct access memory control unit 40, information blocks 60 being transmitted or intended to be transmitted from working memory 30 to communication module 50. This corresponds to the "Tx-operation" referred to further above in FIGS. 2 and 3 and can be carried out, for example, with the aid of the following steps:

receiving 102 a signal, in particular, a trigger signal, and/or an ACK-bit, as in "acknowledge," and/or an interrupt, from processing unit 20, after the signal is received, reading in 104 pieces of control information from at least two information blocks 60 stored in working memory 30, which are provided by processing unit 20 for transmission to communication module 50, which is connected to bus system 12, the pieces of control information characterizing a priority of respective information block 60 for the transmission to communication module 50, the reading-in in this case taking place as a function of the received signal, for example, the reading-in of the pieces of control information can be triggered by the receiving 102 of the signal, evaluating 106 first pieces of configuration information that control a priority evaluation, ascertaining 108 a first priority and/or a second priority from the pieces of control information, and ascertaining 110 a sequence for the transmission of information blocks 60 to communication module 50 as a function of the respective priority.

In one example embodiment, an ascertainment 110 of the sequence for the transmission of information blocks 60 to communication module 50 takes place in this case as a function of the first pieces of configuration information and of the respective first priorities and/or of the respective second priorities, the sequence optionally being ascertained as a function of respective first priorities (block 110a) or of respective second priorities (block 110b) or of respective first priorities and respective second priorities (block 110c).

In one example embodiment, an ascertainment 110 of the sequence for the transmission of information blocks 60 to communication module 50 takes place in this case as a function of the respective first priority if the respective first priorities are different, or as a function of the respective second priority if the respective first priorities are the same.

ascertaining a transmission request from direct memory access control unit 40 to communication module 50, transmitting 112 information blocks 60 from working memory 30 to communication module 50 according to the ascertained sequence using a direct memory access from working memory 30 to communication module 50, and sending 114 an acknowledgement signal to processing unit 20 and/or setting or resetting a flag in an information block 60 for a successful transmission of information block 60 from working memory 30 to communication module 50.

In one example embodiment, the ACK-bit received in block 102 in direct memory access control unit 40 is comparable to the ACK-bit of the acknowledgement signal sent in block 114.

To the extent logically possible and meaningful, the method steps described in FIG. 4 may, if necessary, be executed in a different sequence.

In one example embodiment, the method described in FIG. 4 takes place at least partially without the optional steps, identified by reference numerals 102, 106, 110a, 110b, 110c and 114, which are therefore plotted with dashed lines in FIG. 4.

Figure 5:
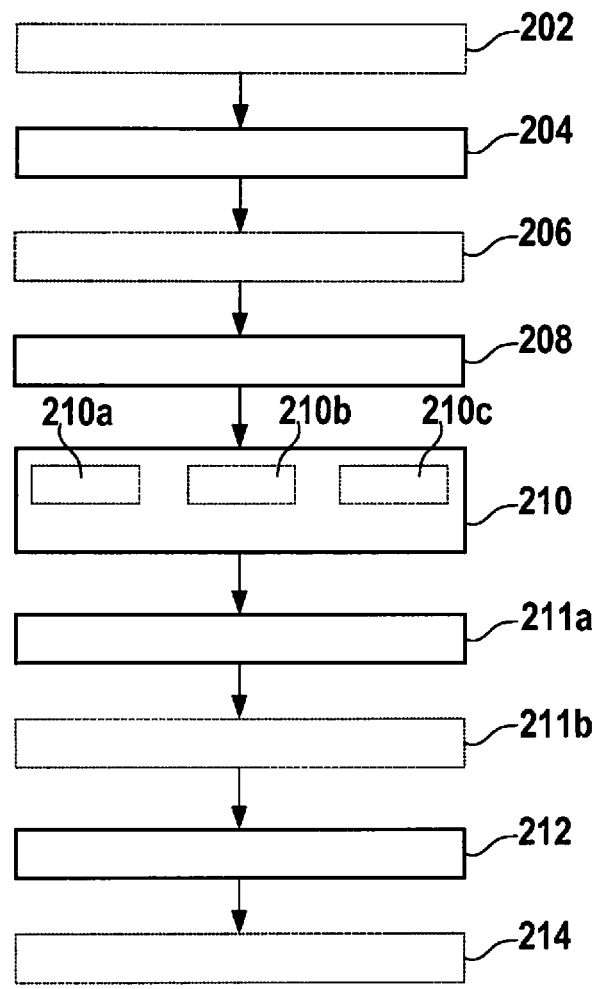
FIG. 5 is a flowchart of a method for carrying out the direct memory access, according to an alternative example embodiment of the present invention.

FIG. 5 is a flowchart for a second example embodiment of a method for operating direct memory access control unit 40, information blocks 60 being transmitted or intended to be transmitted from communication module 50 to working memory 30. This corresponds to the "Rx-operation" identified further above in FIGS. 2 and 3 and can be carried out, for example, with the aid of the following steps:

receiving 202 a signal, in particular, a trigger signal, from communication module 50, which indicates that at least one information block 60 is retained in communication module 50 for transmission to working memory 30 or to one or to multiple working memory units 30_1 through 30_n, and as a result of which direct memory access control unit 40 is prompted to subsequently carry out the reading-in of pieces of control information, after the signal is received, reading in 204 of pieces of control information from at least two information blocks 60 supplied by communication module 50, which are provided by communication module 50 for transmission to working memory 30, which is connected to bus system 12, these pieces of control information characterizing a priority of respective information block 60 for the transmission to working memory 30, and evaluating 206 "first" pieces of configuration information that control a priority evaluation. The first pieces of configuration information, for example, include options for ascertaining the sequence, see steps (1) and (2) further below.

In one example embodiment, direct memory access control unit 40 includes "second" pieces of configuration information, the second pieces of configuration information characterizing respective logical units communicating with communication module 50 and/or pieces of control information to be sent and/or to be received by the respective logical units. The second pieces of configuration information, for example, include all CAN-IDs required for the Rx-operation.

In one example embodiment, direct memory access control unit 40 includes "third" pieces of configuration information, the third pieces of configuration information including variables characterizing processing unit 20, 20_1 through 20_n ("CPU number") and/or working memory 30, 30_1 through 30_n.

The method further includes:
ascertaining 208 a first priority and/or a second priority from the pieces of control information, and
ascertaining 210 a sequence for the transmission of information blocks 60 to working memory 30 as a function of the respective priority.

It is further ascertained to which processing units 20_1 through 20_n or to which associated working memory unit 30_1 through 30_n a respective information block 60 is to be transmitted. Specifically, in one example embodiment, direct memory access control unit 40 includes fourth pieces of configuration information, the fourth pieces of configuration information characterizing a respective source and/or a respective target for the transmission of information blocks 60, see following block 211*a*.

The method includes:
ascertaining 211*a* a target address range in working memory 30 (see FIG. 3) and/or ascertaining a local working memory unit 30_1 through 30_n (see FIG. 2) of working memory 30,
setting 211*b* a flag, in particular, a new flag, in information block 60 to be transmitted, and/or sending an interrupt to processing unit 20 or to respective processing units 20_1 through 20_n, the new flag or the interrupt being provided to communicate to processing unit 20 (or 20_1 through 20_n) that a transmission of information block 60 to working memory 30 (or 30_1 through 30_n) has taken place,
transmitting 212 information blocks 60 from communication module 50 to working memory 30 according to the ascertained sequence using a direct memory access from communication module 50 to working memory 30, and
sending 214 an acknowledgement signal to, and/or setting a flag in, communication module 50 for a successful transmission of an information block 60 from communication module 50 to working memory 30. Thereupon, a memory area provided for the Rx-operation in communication module 50 can at least partially be made available again.

To the extent logically possible and meaningful, the method steps described in FIG. 5 may, if necessary, be executed in a different sequence.

In one example embodiment, only the first priority is used for the method, which in the present case is ascertained directly from the CAN-ID. In one example embodiment, only the second priority is used for the method.

In one example embodiment, the first priority and the second priority are used for the method, the following steps (1) and/or (2) being carried out:
(1) ascertaining 210 the sequence for the transmission of information blocks 60 to working memory 30 as a function of the first pieces of configuration information and of the respective first priorities and/or respective second priorities, the sequence optionally ascertained as a function of respective first priorities (block 210*a*) or of respective second priorities (block 210*b*) or of respective first priorities and respective second priorities (block 210*c*), and (2) ascertaining the sequence for the transmission of information blocks 60 to working memory 30 as a function of the respective first priority if the respective first priorities are different, or as a function of the respective second priority if the respective first priorities are the same.

In one example embodiment, the method described in FIG. 5 takes place at least partially without the steps identified by reference numerals 202, 206, 210*a*, 210*b*, 210*c*, 211*b* and 214, which are therefore plotted by dashed lines in FIG. 5.

Figure 6:
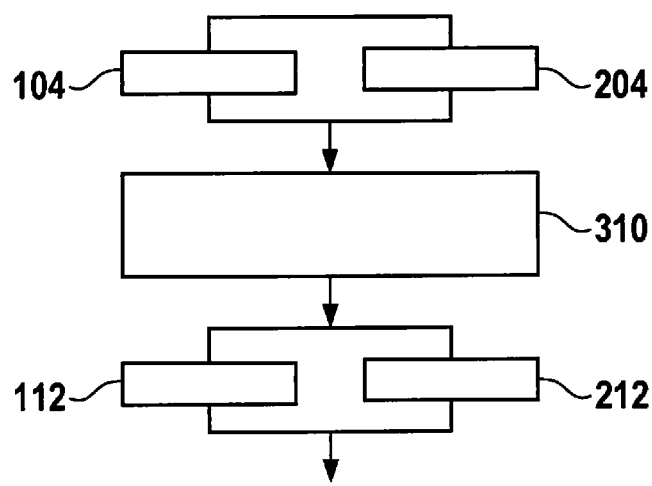
FIG. 6 is a flowchart of a method for carrying out the direct memory access, according to yet another alternative example embodiment of the present invention.

FIG. 6 is a flowchart for a third example embodiment of a method for operating direct memory access control unit 40, information blocks 60 being transmitted or intended to be transmitted both from working memory 30 to communication module 50 as well as from communication module 50 to working memory 30. This corresponds essentially to a shared utilization or shared implementation of the "Tx-operation" and of the "Rx-operation" described further above with the aid of FIGS. 4 and 5, and may, for example, be carried out with the aid of the following steps:
reading in 104 pieces of control information from at least one first information block 60 stored in the working memory, which is provided by processing unit 20 for transmission to communication module 50, which is connected to bus system 12, the pieces of control information characterizing a priority of the at least one first information block 60 for the transmission to communication module 50,
reading in 204 pieces of control information from at least one second information block 60 supplied by communication module 50, which is provided by communication block 50 for transmission to working memory 30, which is connected to bus system 12, these pieces of control information characterizing a priority of the at least one second information block 60 for the transmission to working memory 30,
ascertaining 310 a sequence for the transmission of the at least one first information block 60 and of the at least one second information block 60 as a function of the respective priority of the at least one first and at least one second information block 60, and
transmitting 112 and 212 the at least one first information block 60 from working memory 30 to communication module 50 and/or transmitting the at least one second information block 60 from communication module 50 to working memory 30 according to the ascertained sequence using a direct memory access.

The third example embodiment for the method according to FIG. 6 can be advantageously supplemented, in particular, with the aid of blocks 102, 106*a*, 110*a*, 110*b*, 110*c*, 114, 202, 206, 210*a*, 210*b*, 210*c*, 211*a*, 211*b* and 214 plotted mostly with dashed lines in FIGS. 4 and 5, to the extent each of these are applicable. For the sake of a better overview, this is not described here once again.

What is claimed is:
1. A direct access memory control unit comprising:
a terminal for connecting the direct memory access control unit to a bus system that connects a processing unit to a working memory of the processing unit and to a communication module, the direct access memory control unit being connected to the working memory via the bus system using the terminal and being connected to the communications module via the bus system using the terminal, wherein the direct memory access control unit is configured to:
read in, from at least two information blocks that are provided by the processing unit for transmission to the communication module, pieces of control information that are stored in the working memory and characterize a priority of the respective information block for the transmission to the communication module, wherein the direct access memory control unit reads in the pieces of control information from the working memory via the bus system using the terminal;

ascertain a sequence for the transmission of the information blocks to the communication module as a function of the respective priority; and transmit, via the bus system using the terminal, the information blocks from the working memory to the communication module according to the ascertained sequence using a direct memory access, using the bus system using the terminal, from the working memory to the communication module.

2. The direct memory access control unit of claim 1, wherein:

the direct memory access control unit is configured to receive at least one of a trigger signal, an acknowledgement signal, and an interrupt signal from the processing unit; and the reading in is performed as a function of the received signal.

3. The direct memory access control unit of claim 1, wherein:

the ascertainment of the sequence includes:
evaluating first pieces of configuration information;
ascertaining, for respective ones of the information blocks and from the pieces of control information, at least one of a first priority and a second priority; and
ascertaining the sequence for the transmission of the information blocks to the communication module as a function of the first pieces of configuration information and as a function of the respective at least one of first priority and second priority; and the direct memory access control unit is configured to:
convey a transmission request from the direct access memory control unit to the communication module; and
at least one of send an acknowledgement signal to the processing unit and set a flag in an information block indicating a successful transmission of the information block from the working memory to the communication module.

4. The direct memory access control unit of claim 3, wherein the ascertainment of the sequence includes executing an algorithm that defines that:

where the first priorities of the information blocks are different, the ascertainment of the sequence is based on the respective first priorities of the information blocks; and where the first priorities of the information blocks are the same, the ascertainment of the sequence is based on the respective second priorities of the information blocks.

5. The direct memory access control unit of claim 1, wherein the direct memory access control unit is configured to, for at least two information blocks provided by the communication module for transmission to the working memory:

read in pieces of control information from, and characterizing respective priorities of, the at least two information blocks;

ascertain a sequence for the transmission to the working memory based on the respective priorities of the at least two information blocks provided for the transmission to the working memory; and use a direct memory access from the communication module to the working memory, transmit the at least two information blocks from the communication module to the working memory according to the sequence ascertained for the transmission to the working memory.

6. The direct memory access control unit of claim 5, wherein the direct memory access control unit is configured to:

receive a signal, in response to which the reading in of the pieces of control information from the at least two information blocks is performed;

evaluate first pieces of configuration information that control a priority evaluation;

ascertain at least one of a respective first priority and a respective second priority from the pieces of control information;

ascertain the sequence for the transmission of the at least two information blocks to the working memory based on (a) the first pieces of configuration information and (b) the at least one of the respective first priorities and respective second priorities, wherein the ascertainment of the sequence includes executing an algorithm that defines that:

where the information blocks differ with respect to the first priorities, the ascertainment of the sequence is based on the respective first priorities of the information blocks; and where the information blocks are the same with respect to the first priorities, the ascertainment of the sequence is based on the respective second priorities of the information blocks;

communicate to the processing unit that a transmission of one or more of the at least two information blocks to the working memory has taken place by at least one of (a) setting a flag in one of the at least two information blocks to be transmitted to the working memory and (b) sending an interrupt to the processing unit;

ascertain at least one of a target address range in, and a local working memory unit of, the working memory; and responsive to a successful transmission of an information block from the communication module to the working memory, at least one of send an acknowledgement signal to the communication module and set a flag in the communication module.

7. The direct access memory control unit of claim 1, wherein the direct access memory control unit is configured to:

read in, from at least one first information block that is stored in the working memory and that is provided by the processing unit for transmission to the communication module, pieces of control information that characterize a priority of the at least one first information block for the transmission to the communication module;

read in from at least one second information block that is provided by the communication module for transmission to the working memory, pieces of control information that characterize a priority of the at least one second information block for the transmission to the working memory;

ascertain a sequence for the transmission of the at least one first information block and of the at least one second information block as a function of the respective priorities of the at least one first and at least one second information blocks; and transmit the at least one first information block from the working memory to the communication module and transmit the at least one second information block from the communication module to the working memory according to the ascertained sequences using a direct memory access.

8. The direct access memory control unit of claim 1, wherein the direct access memory control unit includes pieces of configuration information characterizing at least one of respective logical units communicating with the communication module and pieces of control information to be at least one of sent to and received by the respective logical units.

9. The direct access memory control unit of claim 1, wherein the direct access memory control unit includes pieces of configuration information that include variables characterizing at least one of the processing unit and the working memory.

10. The direct access memory control unit of claim 1, wherein the direct access memory control unit includes pieces of configuration information characterizing at least one of a respective source for the transmission of the information blocks and a respective target for the transmission of the information blocks.

11. A method for operating a direct access memory control unit that includes a terminal for connecting the direct memory access control unit to a bus system that connects a processing unit to a working memory of the processing unit and to a communication module, the method comprising:

reading in, by the direct memory access control unit, from at least two information blocks that are provided by the processing unit for transmission to the communication module, pieces of control information that are stored in the working memory and characterize a priority of the respective information block for the transmission to the communication module, wherein the direct access memory control unit reads in the pieces of control information from the working memory via the bus system using the terminal;

ascertaining, by the direct memory access control unit, a sequence for the transmission of the information blocks to the communication module as a function of the respective priority; and transmitting, by the direct memory access control unit via the bus system using the terminal, the information blocks from the working memory to the communication module according to the ascertained sequence using a direct memory access via the bus system using the terminal, from the working memory to the communication module;

wherein the direct access memory control unit is connected to the working memory via the bus system using the terminal and is connected to the communications module via the bus system using the terminal.

12. The method of claim 11, wherein:

the ascertainment of the sequence includes:

evaluating first pieces of configuration information;

ascertaining, for respective ones of the information blocks and from the pieces of control information, at least one of a first priority and a second priority; and ascertaining the sequence for the transmission of the information blocks to the communication module as a function of the first pieces of configuration information and as a function of the respective at least one of first priority and second priority; and the method further comprises:

conveying a transmission request from the direct access memory control unit to the communication module; and at least one of sending an acknowledgement signal to the processing unit and setting a flag in an information block indicating a successful transmission of the information block from the working memory to the communication module.

13. The method of claim 11, further comprising, for at least two information blocks provided by the communication module for transmission to the working memory:

reading in pieces of control information from, and characterizing respective priorities of, the at least two information blocks;

ascertaining a sequence for the transmission to the working memory based on the respective priorities of the at least two information blocks provided for the transmission to the working memory; and using a direct memory access from the communication module to the working memory, transmitting the at least two information blocks from the communication module to the working memory according to the sequence ascertained for the transmission to the working memory.

14. The direct memory access control unit as recited in claim 7, wherein the bus system is a parallel bus, the parallel bus including an address bus and a data bus.

15. The method as recited in claim 11, wherein the bus system is a parallel bus, the parallel bus including an address bus and a data bus.

* * * * *